United States Patent [19]

Phillips et al.

[11] 4,206,643

[45] Jun. 10, 1980

[54] FLOW TOTALIZER

[75] Inventors: Harold H. Phillips, Philadelphia; Milton Mollick, Allentown, both of Pa.

[73] Assignee: Ametek, Inc., New York, N.Y.

[21] Appl. No.: 944,157

[22] Filed: Sep. 20, 1978

[51] Int. Cl.² .......................... G01F 1/24; G01F 15/07
[52] U.S. Cl. ...................................... 73/206; 73/209; 235/92 NT; 250/231 SE
[58] Field of Search ................ 73/194 E, 194 R, 206, 73/209, 228; 235/61 C, 92 MT, 92 NT, 92 FL, 92 V; 250/231 SE, 235, 236

[56] References Cited

U.S. PATENT DOCUMENTS

| | | | |
|---|---|---|---|
| 2,414,086 | 1/1947 | Brewer | 73/209 |
| 3,070,303 | 12/1962 | Schad | 235/92 NT X |
| 3,232,109 | 2/1966 | Harris | 73/209 |
| 3,831,169 | 8/1974 | Raser | 250/231 SE |

FOREIGN PATENT DOCUMENTS 618235 2/1961 Italy ............................................ 73/206

*Primary Examiner*—James J. Gill
*Attorney, Agent, or Firm*—Amster, Rothstein & Engelberg

[57] ABSTRACT

A flow meter is disclosed which is capable of providing a running total of the volume of fluid passing through a tube. The meter includes a vane which is moved along a path to a position corresponding to the rate of the fluid flow through the tube. A sensor is cyclically moved relative to the vane path to produce a pulse signal which is processed to obtain the total fluid volume.

9 Claims, 14 Drawing Figures

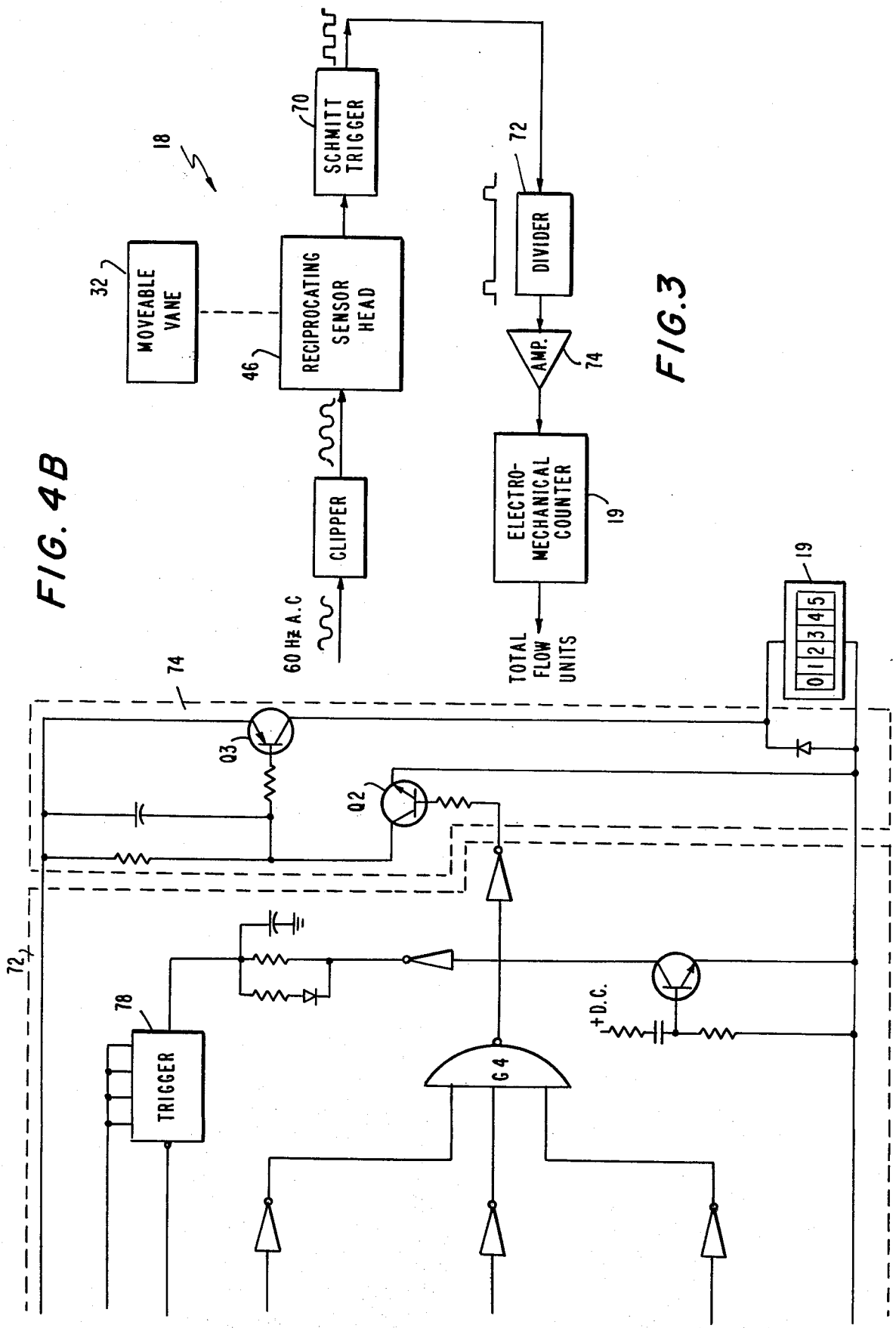

FLOW TOTALIZER

DESCRIPTION OF THE INVENTION

The present invention relates generally to meters for measuring fluid flow, and more particularly to meters which provide an indication of total volume of fluid flow over a period of time.

Meters for displaying total volume of fluid flow are known in the art, examples appearing in U.S. Pat. Nos. 3,043,508 to Wright, and 3,666,928 to Burke, et al. In both of these patents, fluid dispensing systems are disclosed wherein the total number of pulses produced by a flow rate device over a particular period of operation are counted. This total is converted so as to display the total fluid volume, e.g., in gallons, and another conversion of the total count enables display of a sale price. Operation of the circuitry in both of these patents is dependent upon the flow rate device which produces pulses having a frequency proportional to the flow rate or velocity of fluid through the device.

U.S. Pat. No. 3,772,916 to Booth, et al. is also directed to a meter capable of registering total fluid volume. This patent specifies the use of a flow rate device having a rotatable shaft connected to a perforated disc, the disc being arranged to rotate between a light-emitting diode and a phototransistor so as to enable the production of electrical pulses having a frequency proportional to the fluid flow rate.

It will be understood that the known prior fluid volume meters require a flow rate device which produces pulses at a frequency proportional to the fluid flow rate therethrough. These devices usually direct the fluid against an impeller which then imparts rotational motion to a shaft brought outside the device through fluid-tight bushings.

The use of a rotameter type of device, such as disclosed in U.S. Pat. No. 3,232,109 to Harris, is not suggested by any of the above patents since the rotameter is not constructed to readily provide such a pulse signal. Nevertheless, the rotameter type of construction has definite advantages. For example, fluid flow rate is measured by way of a magnetized, movable float or rotor which is axially disposed within an elongated, tapered flow tube. The float is axially moved by the fluid in an amount corresponding to its flow rate. A follower bar, which is curved and inclined to resemble a helix, is pivotally mounted adjacent the flow tube and in magnetic coupling relationship with the float. The follower bar will therefore swing arcuately by an amount corresponding to the float movement. Therefore, an indication of the fluid flow rate through the tube is obtained without the use of rotating shafts and fluid-tight bushings as would be required in the flow rate devices of the known prior art.

Accordingly, it is an overall object of the present invention to overcome the above and other shortcomings of prior art flow meters.

It is another object of the present invention to provide a flow meter of reliable construction which is capable of indicating total fluid volume over a given period of time.

It is a further object of the present invention to provide a flow meter in which a display of total fluid flow volume can be obtained by simple, yet accurate and reliable techniques.

It is a still further object of the present invention to provide a flow meter capable of simultaneously indicating a running total of fluid flow volume and the instantaneous fluid flow rate or velocity.

It is yet another object of the present invention to provide a rotameter type of flow meter capable of providing an indication of the total volume of fluid directed therethrough over a given period of time, such indication being either visual or in a form usable for automatically controlling operations in a fluid control system.

In accordance with a specific embodiment of the present invention, a flow meter comprises a movable member which is mounted for movement responsive to the rate of fluid flowing through the meter. A position element is coupled to the movable member and is moved thereby through a predetermined path by an amount related to the movement of the movable member and hence the fluid flow rate or velocity through the meter. A sensor is provided which is cyclically moved relative to the predetermined path of the position element and produces a sensor signal responsive to the position of the element in its path. Signal processing means receives the sensor signal and produces an output signal corresponding to the total volume of fluid passing through the meter. The output signal can in turn be coupled to an appropriate display device to provide an indication of the total fluid volume, or to a control system for regulating or otherwise controlling the fluid flow.

In a preferred embodiment, the flow meter of the present invention includes a frame, and an elongated, tapered fluid flow tube fixedly mounted with respect to the frame. A magnetized float is mounted for axial sliding movement within the flow tube so that the float assumes a position which corresponds to the rate or velocity of fluid flowing through the tube. An elongated column is mounted to the frame for rotative movement about an axis parallel to that of the flow tube. Extending from the column, and in magnetic coupling relationship with the magnetized float, is a follower bar which imparts rotative movement to the column in response to the axial movement of the float. Thus, the column assumes a rotational position representative of the float position and, hence, of the fluid flow rate through the tube. A vane is coupled to the column for movement along a predetermined path responsive to the movement of the column, and a sensor assembly produces a sensor signal responsive to the position of the vane. The sensor assembly operates to move a sensor head cyclically relative to the vane, and produces an output signal indicative of the vane position over a given period of time. Signal processing means coupled to the output signal of the sensor assembly produces a signal indicative of the total volume of fluid passing through the flow tube.

The above description, as well as further objects, features and advantages of the present invention will be more fully understood by reference to the following detailed description of the presently preferred but nonetheless illustrative embodiment in accordance with the present invention, when taken in conjunction with the accompanying drawing, wherein:

FIG. 3 is a block diagram illustrating the principle of operation of an output signal processing means according to the present invention;

Figure 4A:
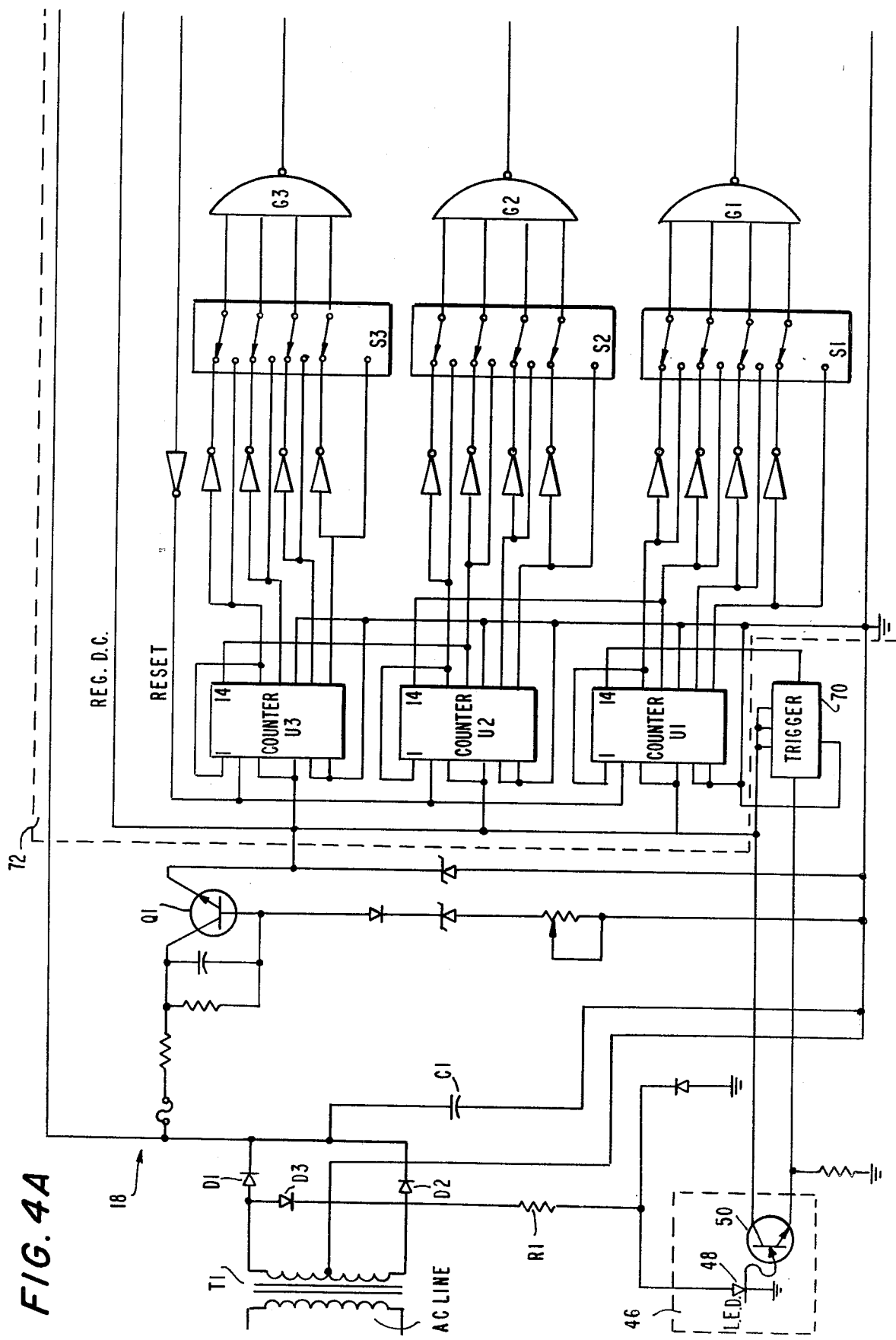

FIGS. 4A and 4B together form an overall schematic diagram of the signal processing means of FIG. 3; and FIGS. 5-7 schematically illustrate operation of a compensation mechanism provided to correct for non-uniform movement of the flow tube float according to the present invention.

Figure 1:
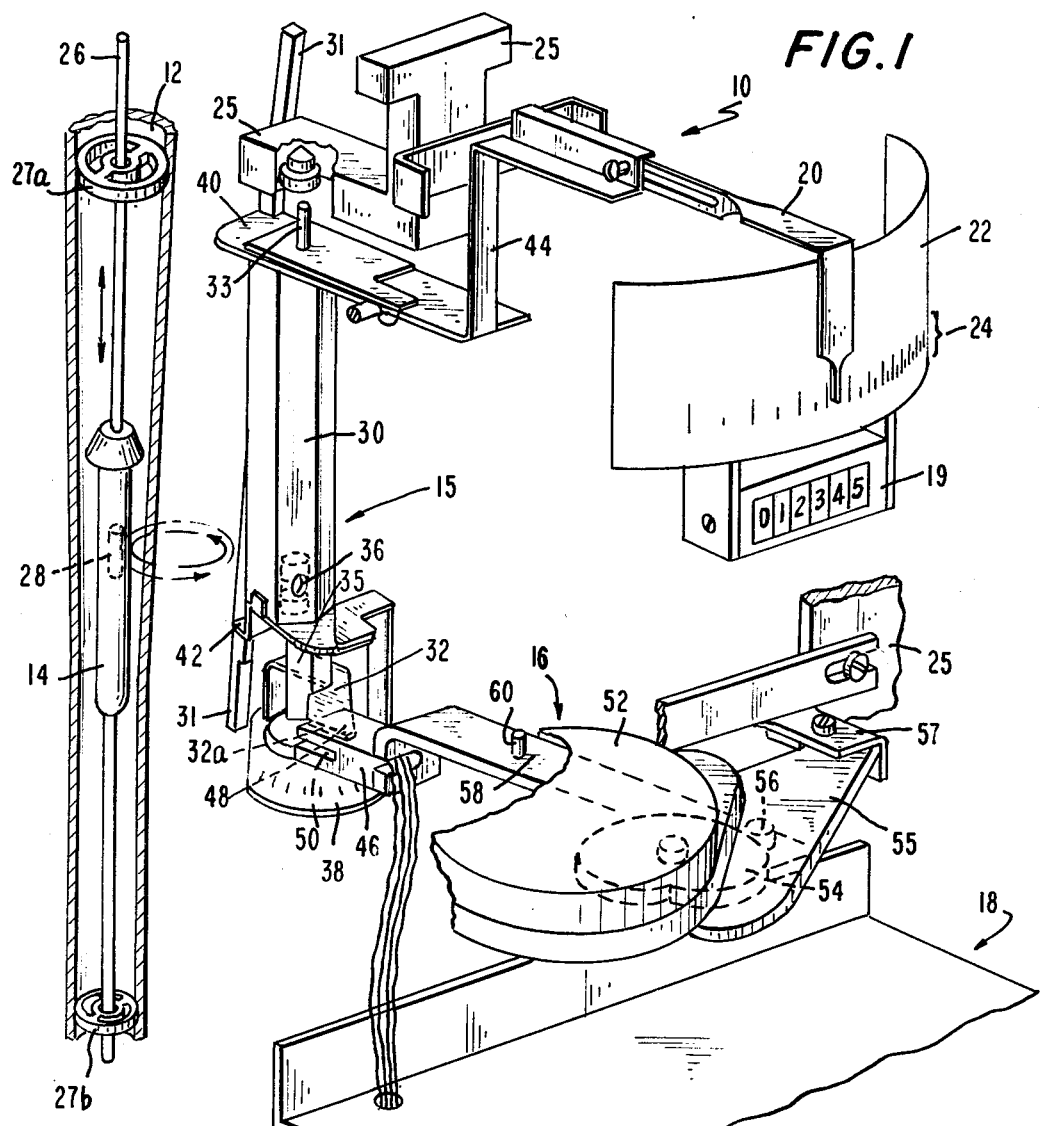
FIG. 1 is a fragmented, perspective and schematic representation of a flow meter, showing a flow tube and a rotameter including a moving position element or vane according to the present invention.
Figure 2:
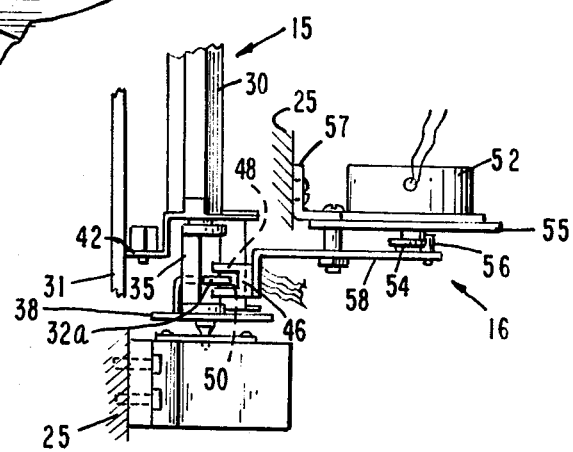
FIG. 2 is a side elevational view of a portion of the flow meter of FIG. 1, showing constructional details of the position element and a sensor assembly for moving a sensor relative to the position element in accordance with the present invention.

Referring now in detail to the drawing and particularly to FIGS. 1 and 2 thereof, there is shown in perspective view an illustrative flow meter embodying features of the present invention, generally designated by the reference numeral 10.

The flow meter 10 is of a rotameter design and includes an elongated, tapered fluid flow tube 12 having a magnetized float 14 mounted for axial sliding movement therein, a follower assembly 15 responsive to the position of magnetized float 14, and a sensor assembly 16 for sensing the position of follower assembly 15 and to provide an output indicative of the follower assembly position over a given period of time.

Flow tube 12, fixedly mounted relative to the follower assembly 15, operates to conduct the fluid whose total volume is to be measured by the flow meter 10. An indication of the fluid volume is obtained by way of an electronic signal processing network 18 coupled to the sensor assembly 16 as shown in outlined form in FIG. 1, and described later in greater detail in connection with FIGS. 3, 4A and 4B.

An electro-mechanical counter 19 may be provided for visually indicating the total fluid volume. An indication of the instantaneous fluid flow velocity or rate is provided by a dial pointer 20 which is arranged to move over a dial plate 22 having a series of calibrated graduation marks 24 thereon.

In the present embodiment, components of the flow meter 10, including the following assembly 15, sensor assembly 16 and processing network 18, are mounted to a frame 25, portions of which are shown in FIGS. 1 and 2. Also, frame 25 is itself contained within a housing (unshown) so as to provide a protective closure for the meter components and to enable the present flow meter to be readily transported from one location to another and easily placed in use. The housing is preferably formed of strong non-magnetic material such as cast aluminum.

The flow tube 12 may be incorporated as an integral part of the flow meter 10, to be connected in the path of the fluid flow, or the tube 12 may be permanently installed at one or more system locations with the remaining components of the flow meter 10 enclosed in a housing, as described above. In the latter case, the housing should be constructed and arranged to clamp to a selected flow tube 12 at precise locations thereon by way of locating pins or the like, the reason for this requirement being explained below. The material forming flow tube 12 should also be nonmagnetic and may comprise metal, glass or plastic.

Turning to further details of flow tube 12, a rod 26 is mounted in axial alignment therein and extends through guides 27a, 27b fixedly mounted within the upper and lower ends of tube 12, respectively as shown. Float 14 is axially joined to rod 26 roughly midway along the length of the rod, so that the float and rod together will slide smoothly to a position corresponding to the velocity or rate of fluid flowing upwardly through the tube 12.

Ideally, this movement of the float 14 should linearily correspond to the fluid velocity. However, non-uniformities occur for which compensation can be provided, as explained in connection with FIGS. 5-7. Float 14 is formed of a non-corrosive material which surrounds a magnetic element 28 mounted therein. Also, connecting flanges can be provided at respective ends of the tube 12 for coupling the tube in fluid-tight relationship with a fluid flow system, these flanges being conventional and therefore not shown in the drawing.

The follower assembly 15 operates to track the axial movement of float 14 within the enclosed flow tube 12, and includes an elongated column 30 which is mounted for rotative movement about an axis substantially parallel to that of the flow tube 12. A follower bar 31 formed of a high permeability metal is joined to the column 30 and extends therefrom to define a spiral arc around the column 30, as shown in FIG. 1. Accordingly, when the magnetized float 14 in the flow tube 12 and the follower bar 31 joined to the column 30 are precisely located relative to each other, the magnetic element 28 in float 14 and the follower bar 31 are brought in magnetic coupling relationship with each other, so that the follower bar 31 swings leftwardly or rightwardly in response to movement of float 14 upwardly or downwardly, as viewed in FIG. 1, respectively. This occurs because the follower bar 31 seeks to maintain its body as closely as possible to the magnetic element 28 inside float 14 and, in so doing, will swing arcuately about the axis of the column 30. Thus, the column 30 will rotate to a position indicative of the position of the float 14 in flow tube 12 and, hence, the velocity or rate of fluid flow in the tube 12.

The rotational position of column 30 is indicated by the dial pointer 20 which is fixedly joined to the top of the column 30 by a bracket extending therefrom. The dial plate 22 is calibrated so that its markings 24 translate the rotational position of the column 30 into a fluid flow rate directly readable on the dial plate 22.

Coupled to the bottom of the column 30 is a position element or vane 32 having a leading edge 32a. The vane is moved over a particular path in response to the rotational movement of the column 30. The position of the vane edge 32a is sensed by the sensor assembly 16 repeatedly at a fixed repetition rate, the sensor assembly 16 then operating together with the signal processing network 18 to translate the positions assumed by the vane edge 32a into a signal indicative of the total fluid volume passing through the tube 12.

Referring now to specific details of the follower assembly 15, column 30 has a stub axle 33 extending from its upper end, as shown in FIG. 1, to pivotally engage a ball bearing collar 34 seated within a portion of the frame 25. Stub axle 33 is shown separated from the bearing collar 34 for purposes of illustration only. Extending below the column 30 is a relatively short support piece 35, shown more clearly in FIG. 2. Support piece 35 has a stub axle extending downwardly therefrom for engaging another bearing collar in a portion of the frame 25.

The support piece 35 is axially aligned with the column 30 and is joined thereto for adjustment to a desired rotational position with respect to the column member 30, whereupon the support piece 35 is tightly joined to the column 30 by a set screw 36 (FIG. 1). This adjustable movement of the support piece 35 allows rotation of an adjustment plate 38 fixedly joined to the bottom thereof. Vane 32 extends up from one side of the adjustment plate 38 and bends to extend transversely about a portion of the support piece 35 in the manner shown. The purpose of adjustment plate 38 is to provide volume measurement compensation for nonlinearities in the movement of the float 14 with respect to the flow rate through the tube 12, by allowing the vane edge 32a to be set at a desired position relative to the column 30 and the sensor assembly 16.

Thus, it will be understood that under normal operating conditions the column 30, support piece 35, adjustment plate 38 and the vane 32 will rotate together about the axis of the column 30 in response to movement of the float 14 in flow tube 12.

As indicated earlier, the follower bar 31 is fixedly held in position relative to the column 30 by way of a pair of brackets 40 and 42 which are securely joined to respective ends of the column 30 and extend in the direction of the flow tube 12. Another bracket 44 is securely joined to the top of column 30 and extends toward the dial plate 22 to support the dial pointer 20.

The sensor assembly 16, which operates to provide an indication of the positions assumed by the vane edge 32a during movement of the vane 32, will now be further described.

It will be understood that as column 30 assumes rotational positions corresponding to various fluid flow rates through the tube 12, the vane 32 is moved along with the column as already explained. One end of the path of movement of vane 32 corresponds to the position of the column when the fluid flow rate is zero, and the other end of the vane path corresponds to the position of the column for maximum flow rate conditions. For fluid flow rates between these extremes, vane 32 assumes intermediate positions along its path.

Sensor assembly 16 operates to produce a signal in response to the position of the vane edge 32a, and includes a sensor head 46 which is generally U-shaped, having a slot extending therethrough. Sensor head 46 includes a light-emitting device such as a light-emitting diode ("LED") 48 seated in one side of the slot and a light-sensing device such as a phototransistor 50 seated in the other side of the slot to confront the LED 48. This LED/phototransistor pair is arranged within the sensor head 46 so that phototransistor 50 senses light transmitted by the LED 48 unless such light is interrupted by the vane 32 when its edge 32a passes through the slot of the sensor head 46.

The fluid flow volume is obtained by cyclically moving the sensor head 46 relative to at least a portion of the path followed by the vane 32, and determining the amount of light sensed by the phototransistor 50 over one complete cycle of the sensor head movement. In other words, assuming a constant fluid flow rate of about half the maximum value which could be measured by the flow meter 10, the vane 32 would assume a position roughly as shown in FIG. 1. Cyclical movement of the sensor head 46 relative to the path of movement of the vane 32 would result in interruption of light sensed by the vane edge 32a, for approximately one-half of each sensor head cycle. Accordingly, if the light emitted by the LED 48 is pulsed at a known fixed repetition rate, then one-half of the total number of pulses emitted by LED 48 during one cycle of movement of the sensor head 46 will be detected by the phototransistor 50. These detected pulses may then be converted by a known scaling factor to provide a total count or indication of the fluid volume passing through the flow tube 12. Thus, an accurate, reliable indication of total fluid volume is obtained in response to movement of the rotor 14 in the enclosed flow tube 12, without the need for any members to extend out from the tube 12 such as rotating shafts or the like.

Sensor assembly 16 preferably includes a motor 52 which imparts rotary movement to a cam 54. Motor 52 should be of the synchronous type to ensure a constant known rotational speed, and is mounted to a portion of the frame 25 by a planar base plate 55 and an adjustable bracket 57. Cam 54 engages a cam follower 56 which, in turn, extends from one end of an arm 58. The arm 58 has the sensor head 46 fixedly mounted at its other end, and is pivotally mounted to the base plate 55 at 60. Accordingly, as the rotating cam 54 imparts periodic reciprocating movement to one end of the arm 58, the sensor head 46 cyclically moves over a given portion of the operational path of the vane 32. It has been found that reciprocating the arm 58 at a rate of about 10 cycles a minute provides satisfactory results.

Fine adjustments can be made to obtain accurate indications of total fluid volume by sliding the base plate 55 within the bracket 57 toward or away from the vane 32, and by sliding the bracket 57 laterally so as to position the moving sensor head 46 in proper orientation relative to the vane edge 32a.

The signal processing network 18, shown in block form in FIG. 3, operates both to energize the LED 48 in the sensor head 46 at a known fixed pulse frequency, and to detect and count the light pulses sensed by the phototransistor 50 to thereby provide an output signal corresponding to the volume of fluid passing through the flow tube 12. In the preferred embodiment, the network 18 provides square wave pulses of about 5 volts peak and at a frequency of 60 hz. to the LED 48. The light pulses detected by phototransistor 50 are converted to corresponding electrical pulses and applied to a Schmitt trigger 70 to insure a good square pulse shape. A divider 72 operates to accumulate the pulses from Schmitt trigger 70 and to perform a dividing operation on these pulses by a selected scale factor. Output pulses from divider 72 are amplified at 74 and applied to the electro-mechanical pulse counter 19 to provide a running visual display of the fluid volume in appropriate units.

Further details of the signal processing network 18 will be explained with reference to the illustrative schematic diagram of FIGS. 4A and 4B.

Standard 60 hz. AC line voltage is applied to the primary winding of a transformer T1, the secondary winding of which is arranged in a full-wave rectification circuit comprising diodes D1 and D2 and electrolytic capacitor C1, as shown in FIG. 4A. An unregulated DC voltage is obtained, which is regulated by way of transistor Q1 in a conventional circuit configuration to provide a regulated DC voltage for the divider 72.

Energization of the LED 48 in sensor head 46 is enabled by a series circuit including diode D3, connected at its anode end to one of the secondary leads of transformer T1 and resistor R1, connected at one end to the cathode of diode D3 and at its other end to the anode of the LED 48, the cathode of LED 48 being grounded. Pulses corresponding to detected light are obtained at the emitter of phototransistor 50, and applied to the Schmitt trigger circuit 70 which may be obtained in a conventional integrated circuit package as shown in FIG. 4A. The output of Schmitt trigger 70 is coupled to a three stage cascaded binary counter comprising conventional integrated circuits designated U1, U2 and U3. The binary count accumulated by counters U1, U2 and U3 is inverted, and then divided by a predetermined scale factor by way of three corresponding hexidecimal switches S1, S2 and S3, respectively. These switches are also conventional and may be obtained in suitable packaged form. The outputs from the switches S1, S2 and S3 are passed through corresponding NAND gates G1, G2 and G3, respectively, the output of these gates being applied to the input of another NAND gate G4 through invertors, as shown in FIG. 4B. The output of NAND gate G4 is applied to the input of amplifier 74 comprising transistors Q2 and Q3, and to another Schmitt trigger network 78 which operates to provide a reset pulse for the divider 72. The output of amplifier 74 is applied to the electromechanical counter 19, which advances one unit for each pulse applied thereto from the amplifier 74.

Operation of the present flow meter 10 will now be further explained with regard to the signal processing network 18 of FIGS. 4A and 4B.

The network 18 basically operates to count the number of light pulses sensed by the phototransistor 50 and to generate a single pulse at its output for actuating the display counter 19 upon the accumulation of a predetermined number of counts. Assuming that the LED 48 is energized by 60 hz. square-wave pulses, it is therefore known that LED 48 will emit 3,600 pulses of light per minute. If a displayed count on the counter 19 of only "100" is selected as corresponding to total fluid volume under maximum flow rate conditions at the end of one minute, then the hexidecimal switches S1, S2 and S3 are preset to divide the output from the binary counters U1, U2 and U3 by a scale factor of 36 (3,600÷100). Thus, each time 36 pulses are accumulated on counters $U_1$, $U_2$, $U_3$, a single pulse is delivered to amplifier 74 for resetting the counters and driving the electromechanical display counter 19.

Proper operation of the flow meter 10 under maximum flow conditions can be simulated by moving the vane 32 completely out of the slotted sensor head 46 so as to allow the phototransistor 50 to detect all of the light pulses emitted by LED 48 during a timed interval. The total fluid volume corresponding to the maximum obtainable flow rate through the tube 12 should then be indicated on the counter 19, i.e., "100". The dial pointer 20 may then be moved to an intermediate position representing, say, 50% flow rate according to the dial markings 24. The indicated count representing fluid volume over the same timed interval should then be half the previously obtained count, i.e., "50", if the flow meter 10 is properly calibrated.

When the movement of the float 14 does not correspond linearly with the fluid flow rate through the tube 12, it is necessary to introduce a compensatory non-linearity in the follower assembly 15 by way of the adjustment plate 38, as mentioned earlier. This adjustment will now be explained with reference to FIGS. 5-7.

Figure 5A:
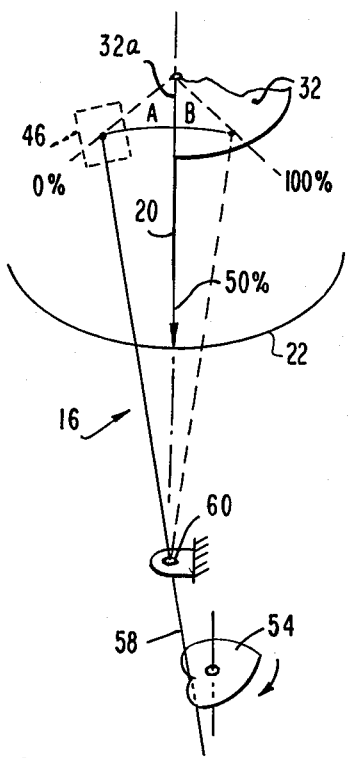
Figure 5B:
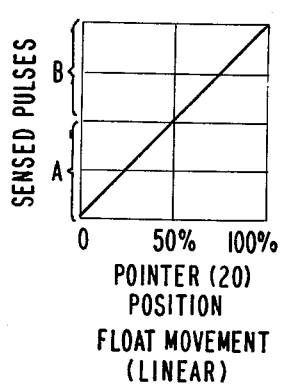
Figure 5C:
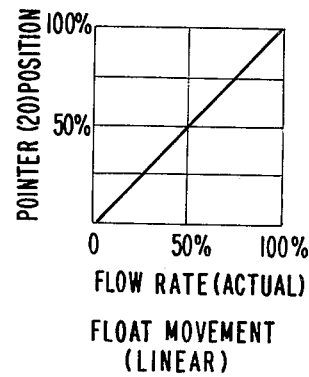

FIGS. 5A–5C schematically illustrate an ideal situation in which the float movement (and hence movement of the dial pointer 20) is directly proportional to the actual fluid flow rate (see FIG. 5C), and particularly at a time when the dial pointer 20 indicates a reading on dial plate 22 of 50% maximum flow rate. Therefore, over one cycle of movement of the sensor assembly 16, it will be understood that one-half the total number of pulses emitted by the LED 48 therein should be sensed to obtain an accurate total fluid volume reading on the display counter 19. Therefore, the path of movement of the sensor head 46 with respect to vane edge 32a is set, by movement of the adjustment plate 38, to correspond to arc AB in FIG. 5A. As shown in FIG. 5B, the time interval spent by the sensor head 46 in moving over arc A, wherein the vane 32 does not interrupt the light pulses, equals that spent in moving over arc B wherein the light pulses are blocked and not sensed. The number of pulses sensed will therefore be precisely one-half the number of pulses which would be sensed when the vane edge 32a is at the 100% flow rate position, and an accurate total volume indication will be provided over each cycle of sensor head movement.

Figure 6A:
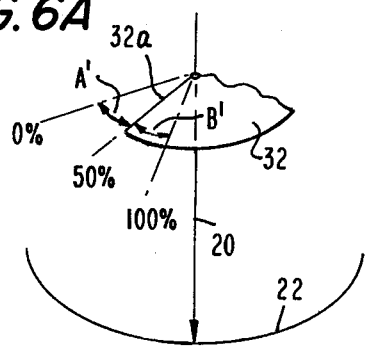
Figure 6B:
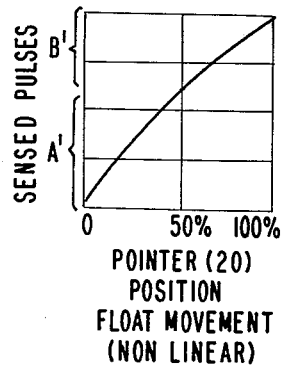
Figure 6C:
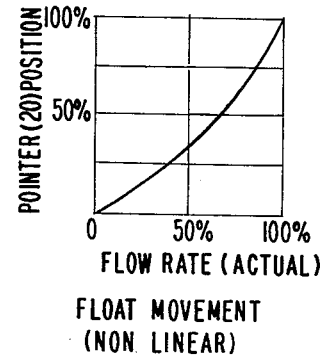

FIGS. 6A–6C illustrate a non-linear pointer position flow rate characteristic (see FIG. 6C) in which a dial pointer indication of 50% of maximum pointer position corresponds to a flow rate which is actually greater than 50%. This would cause a lower fluid volume indication to be provided on the display counter than that which actually passes through the flow meter 10 after a given time period, if the vane 32 were positioned and the sensor head 46 moved as shown in FIG. 5A. With the relative vane position represented in FIG. 6A, the number of pulses sensed by the sensor head 46 (unshown) while scanning through arc A' will be greater than those obtained over arc B', as indicated in FIG. 6B. Accordingly, an accurate total flow volume corresponding to more than a 50% flow rate over a given period of time will be provided by the flow meter 10.

Figure 7A:
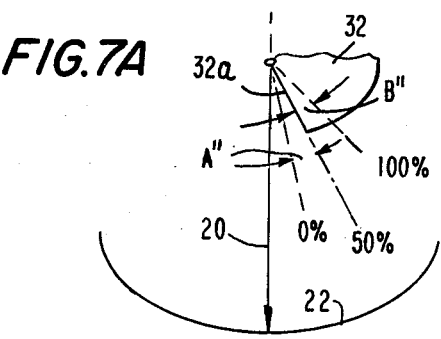
Figure 7B:
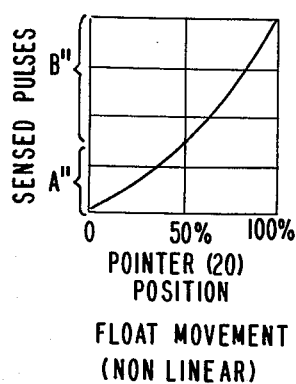
Figure 7C:
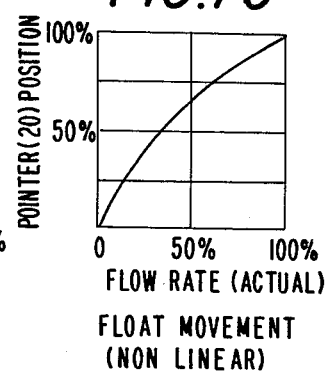

FIGS. 7A–7C illustrate another non-linear pointer position-flow rate characteristic (see FIG. 7C) in which the dial pointer 20 indication of 50% of maximum pointer position corresponds to a flow rate which is actually less than 50%. See FIG. 7C. In such case, the vane edge 32a is adjusted so that fewer pulses are sensed over arc A" than arc B". This adjustment will provide fewer sensed pulses as the sensor head 46 (unshown) moves over the arc A" than when it moves over the arc B", and enable an accurate total volume indication to be provided.

Of course it will be understood that many variations and modifications of the above described embodiment, all within the spirit and scope of the present invention, will be apparent to a worker skilled in the art. For example, the output of the signal processing network 18 need not necessarily be displayed on an electromechanical counter, but can be viewed in any convenient form such as by conventional electronic digital displays. Moreover, rather than just provide a visual count corresponding to fluid volume, the output of the signal processing network 18 may be used to control various components in a fluid control system so as to regulate or otherwise control the flow of fluid therethrough upon the attainment of a particular fluid volume.

Also, although the present invention is shown embodied within a rotameter type of construction, it may be applied as well to any other flow meter device in which a member such as the vane 32 is moved to a particular position in response to a corresponding rate or velocity of fluid flowing therethrough.

Accordingly, the present embodiment is to be considered as illustrative and not restrictive, the scope of the invention being indicated by the claims rather than by the foregoing description, and all changes which come within the meaning and range of equivalents of the claims are therefore intended to be embraced therein.

What is claimed is:

1. In a flow meter of the type having a follower element mounted therein for movement responsive to the velocity of fluid flowing through said meter, the improvement comprising a position element mounted in said meter and coupled to said follower element for movement along a predetermined path in response to movement of said follower element, a sensor head mounted in said meter including a light source and light sensing element for converting light impinging thereon into an electrical signal mounted in said sensor head in spaced apart relationship to permit at least a portion of said position element to pass between said light sensing element and said light source, means for cyclically moving said sensor head relative to said position element so that said position element interrupts the light impinging upon said light sensing element for a period of time during each cycle of movement of said sensing head which depends upon the relative location of said position element along said predetermined path and means coupled to the output of said light sensing element and responsive to electrical signals produced therefrom for providing an indication of the total fluid volume passing through said meter.

2. The improved flow meter of claim 1 wherein said light source is a light emitting diode and said light sensing element is a phototransistor.

3. In a flow meter of the type having a follower element mounted therein for movement responsive to the velocity of fluid flowing through said meter, the improvement comprising a position element mounted in said meter and coupled to said follower element for movement along a predetermined path in response to movement of said follower element, a sensor head mounted in said meter including a light source and light sensing element responsive to light impinging thereon for coverting light to an electrical signal mounted in said sensor head in spaced apart relationship to permit at least a portion of said position element to pass therebetween, means coupled to said light source for periodically turning said light source on and off by supplying a pulse signal of given frequency thereto to produce corresponding pulses of light from said light source, means for cyclically moving said sensor head relative to said position element so that said position element interrupts the light impinging upon said light sensing element for a period of time during each cycle of movement of the sensing head dependent upon the relative location of said position element along said predetermined path, means coupled to the output of said light sensing element and responsive to the signal therefrom for providing an indication of total fluid volume passing through the meter.

4. In a flow meter of the type having a follower element mounted therein for movement responsive to the velocity of fluid flowing through said meter, the improvement comprising a position element coupled to said follower element mounted in said meter for movement along a predetermined path in response to movement of said follower element, a sensor head mounted in said meter including a slot therein having opposed end walls, a light source mounted in one of said end walls and a light sensing element mounted in the opposite end wall to be responsive to light from said light source, said sensor head being mounted in said meter relative to said position element to permit at least a portion of said position element to pass through said slot, means for pivoting said sensor head relative to said position element so that said position element interrupts the light impinging upon said light sensing element for a period of time during each cycle of movement of the sensing head which depends upon the relative location of said position element along said predetermined path and means coupled to said light sensing element and responsive to electrical signals produced therefrom for providing an indication of the total fluid volume passing through the meter.

5. A flow meter for providing an indication of the volume of fluid flow therethrough, said meter comprising a frame, an elongated tapered flow tube fixedly mounted with respect to said frame for conducting said fluid, a magnetic float mounted for axial sliding movement within said flow tube, said float being constructed and arranged to assume a position dependant upon the velocity of fluid flowing through said flow tube, an elongated column mounted to said frame for rotative movement about an axis substantially parallel to the axis of said flow tube, a follower bar extending from said column and positioned in magnetic coupling relationship with said magnetic float, said follower bar being mounted for rotational movement in response to axial movement of said magnetic float and coupled to said column to impart rotational movement thereto in response to rotational movement of said follower bar, said column assuming a rotational position indicative of the position of said float in said flow tube, a vane coupled to said column for movement along a predetermined path in response to rotational movement of said column, a sensor assembly including a generally U-shaped sensor head having a slot therethrough for producing a sensor signal in response to the position of said vane, said sensor head including a light emitting diode mounted therein on one side of said slot and a phototransistor mounted therein on the other side of said slot to detect light transmitted from said diode, means for supplying a pulse signal of given frequency to said light emitting diode to produce corresponding pulses of light so that said sensor signal comprises a train of pulse signals, said vane being constructed and arranged to pass through said slot and to interrupt the transmission of light to said phototransistor, means for cyclically moving said sensor head relative to said vane to periodically produce a position indicating signal indicative of the position of said vane along said predetermined path, signal processing means responsive to said position indicating signal including means for counting said pulse signals to provide a signal indicative of said volume of fluid flow, and adjustment means coupled between said column and said vane for varying the predetermined path of said vane with respect to said sensor assembly to compensate for nonlinearities in the response of the flow meter to the flow of fluid through the flow tube.

6. The flow meter according to claim 5 wherein said adjustment means comprises a plate mounted in said meter and movable relative to said column, said vane being coupled to said plate and movable therewith to a selected position with respect to said column for compensating for nonlinearities in the response of the flow meter to the flow of fluid through said flow tube.

7. The flow meter according to claim 6 wherein said adjustment means further includes a support piece mounted to said plate in axial alignment with said column, said support piece being free to move with said plate with respect to said column, said vane being coupled to move with said support piece, and means for securing said support piece to said column to fix said vane in its selected position with respect to said column for compensating for nonlinearities in the response of said flow meter.

8. In a flow meter of the type having a follower element mounted therein for movement responsive to the velocity of fluid flowing through said meter, the improvement comprising a position element mounted in said meter and coupled to said follower element for movement along a predetermined path in response to movement of said follower element, a sensor head assembly mounted in said meter for sensing the position of said position element along said predetermined path and providing therefrom an indication of the total fluid volume passing through said meter, and adjustment means coupled to said position element for varying the predetermined path of said position element with respect to said sensor assembly to compensate for nonlinearities in the response of the flow meter to the flow of fluid through the flow meter.

9. The flow meter of claim 8 wherein said sensor assembly includes a light source and light sensing element for converting light impinging thereon into an electrical signal mounted in said sensor assembly in spaced apart relationship to permit at least a portion of said position element to pass therebetween and means for cyclically moving said sensor head relative to said position element.

* * * * *